(12) United States Patent
Yang

(10) Patent No.: US 11,072,216 B2
(45) Date of Patent: Jul. 27, 2021

(54) INDEPENDENT REAR SUSPENSION SYSTEM

(71) Applicant: An-Tao Anthony Yang, Langley (CA)

(72) Inventor: An-Tao Anthony Yang, Langley (CA)

( * ) Notice: Subject to any disclaimer, the term of this patent is extended or adjusted under 35 U.S.C. 154(b) by 43 days.

(21) Appl. No.: 16/391,325

(22) Filed: Apr. 23, 2019

(65) Prior Publication Data
US 2020/0070606 A1    Mar. 5, 2020

(30) Foreign Application Priority Data

Sep. 4, 2018 (TW) ................................ 107212111

(51) Int. Cl.
| | | |
|---|---|---|
| *B60G 3/12* | (2006.01) | |
| *B60G 7/00* | (2006.01) | |
| *B60G 21/05* | (2006.01) | |
| *B60G 3/20* | (2006.01) | |
| *B60G 11/27* | (2006.01) | |

(52) U.S. Cl.
CPC ............... *B60G 7/005* (2013.01); *B60G 3/20* (2013.01); *B60G 7/008* (2013.01); *B60G 11/27* (2013.01); *B60G 21/05* (2013.01); *B60G 2200/144* (2013.01); *B60G 2200/18* (2013.01); *B60G 2204/1484* (2013.01); *B60G 2206/10* (2013.01); *B60G 2300/14* (2013.01); *B60G 2300/38* (2013.01)

(58) Field of Classification Search
CPC .......... B60G 7/008; B60G 21/05; B60G 3/20; B60G 7/005; B60G 11/27; B60G 2300/38; B60G 2200/144; B60G 2204/421; B60G 2300/14; B60G 2200/18; B60G 2206/10; B60G 2204/148
USPC .... 280/124.128, 124.134, 124.135, 124.136, 280/124.109
See application file for complete search history.

(56) References Cited

U.S. PATENT DOCUMENTS

| | | | | |
|---|---|---|---|---|
| 5,000,477 A | * | 3/1991 | Minakawa | B60G 3/202 280/124.136 |
| 7,784,807 B2 | * | 8/2010 | Brandl | B60G 7/008 280/124.135 |
| 8,444,160 B2 | * | 5/2013 | Okamoto | B60G 3/20 280/124.135 |
| 2018/0086164 A1 | * | 3/2018 | Tanahashi | B60G 7/001 |
| 2019/0193501 A1 | * | 6/2019 | Brady | B60G 3/202 |
| 2020/0047576 A1 | * | 2/2020 | Warmerdam | B62D 7/18 |

* cited by examiner

*Primary Examiner* — Toan C To

(57) ABSTRACT

The present invention provides an independent rear suspension system for low-floor bus for reducing the distance between the floor and ground, offering easy access for passengers and offering a wide space between the wheel arches.

3 Claims, 6 Drawing Sheets

INDEPENDENT REAR SUSPENSION SYSTEM

BACKGROUND

In order to improve the ease of passenger embarkment and disembarkment, the current engine driven city bus, in particular those with wheelbase exceeding four meters, is required to minimize the floor height. Limited by the passenger compartment, the engine is allocated in the rear overhang; however, for a rear wheel driven city bus, the floor height over rear axle remains high, regardless the use of center-mounted or side-mounted differential, thus, steps or a slope is needed in the proximity of the rear axle.

Also, for the front engine rear wheel drive minibus, in particular those with wheelbase under four meters and with the engine is placed in the front overhang, a transmission is attached behind the engine, and a propeller shaft is used to transmit torque to the rear axle. Since the propeller shaft connects the front located transmission and the rear axle, the floor height cannot be lowered. Steps or a slope are provided at the entrance to enable passenger embarkment.

As for the rear engine rear wheel drive minibus, in particular those with wheelbase under four meters and with engine placed in the rear overhang, a transmission is attached forward to the engine, and a propeller shaft connects the transmission to the rear axle. Due to the location of the propeller shaft, floor height aft of rear axle cannot be lowered. Steps or a slope is needed in the proximity of the rear axle.

There is also motor driven front wheel drive minibus, in particular those with wheelbase under four meters and with motor placed in the front overhang, low floor passenger compartment is provided between the front axle and the rear axle; however, in order to host the rear dead axle, a step and an increased floor height is needed over the rear axle.

There is furthermore motor driven rear wheel drive minibus, in particular those with wheelbase under four meters and with motor placed in the rear overhang, low floor passenger compartment is provide between the front axle and the rear axle; however, floor height behind the rear axle is increased in order to host rear live axle and the drivetrain, therefore, steps are needed in the proximity of the rear axle.

Above mentioned bus configurations cannot achieve low floor height throughout the vehicle, regardless of the type and placement of the power source and location of the drive wheels, slope or steps are always needed.

Currently used vehicle suspension connects to the chassis via structure inner to the wheels, for which the structure near the suspension mounting must be strengthened to bare the load. Especially for the body-on-frame configuration vehicle which the bare chassis alone has sufficient strength to bear the load of engine, transmission, suspension and axles, without the presence of the body cab.

Due to the fact that the suspension linkage connects to the structure inward of the wheels, service technician must be underneath the vehicle by either lifting the vehicle or by entering a service ditch when performing wheel alignment.

In the case of multi-link or double wishbone type suspension, when the suspension system is subjected to a lateral load during cornering, the outside upper link is subjected to tension and outside lower link is subjected to compression, while the inside upper link is subjected to a compression and inside lower link is subjected to a tension.

FIELD OF THE INVENTION

The present invention provides an independent suspension system, in particular an independent rear suspension for low floor buses.

SUMMARY OF THE INVENTION

The primary objective is to provide an independent rear suspension design for low floor bus which can minimize the floor height above the rear axle.

The secondary objective is to provide an independent rear suspension design which does not concentrate all the load on the chassis structure between the wheels, further reduces the structural needs in the chassis, thus giving more volume to the passenger compartment.

The third objective is to provide an independent rear suspension for low floor bus which does not require the service technical to be underneath the vehicle while performing wheel alignment, thus minimizing the time consumption and the risk.

It is also an objective to provide an independent rear suspension for low floor bus with proper camber variable during suspension travel.

It is also an objective to provide an independent rear suspension for low floor bus which also connects to the chassis structure outward of the wheels, in which prevents buckling of the outside lower link by subjecting said link to a tension.

It is also an objective to provide an independent rear suspension for low floor bus which comprises seven kinematic links and ten kinematic pairs.

It is also an objective to provide an independent rear suspension for low floor bus which an electric machine is attached to the rear trailing arm providing wheel traction.

DESCRIPTION

Figure 1:
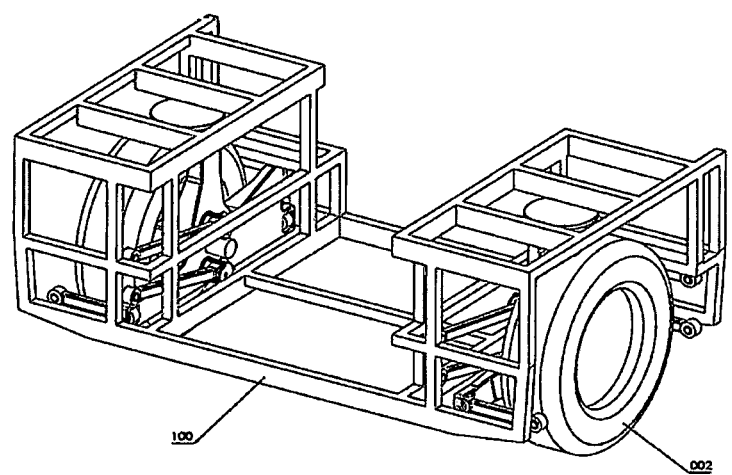
FIG. 1 is an isometric view of the first embodiment with chassis.
Figure 2:
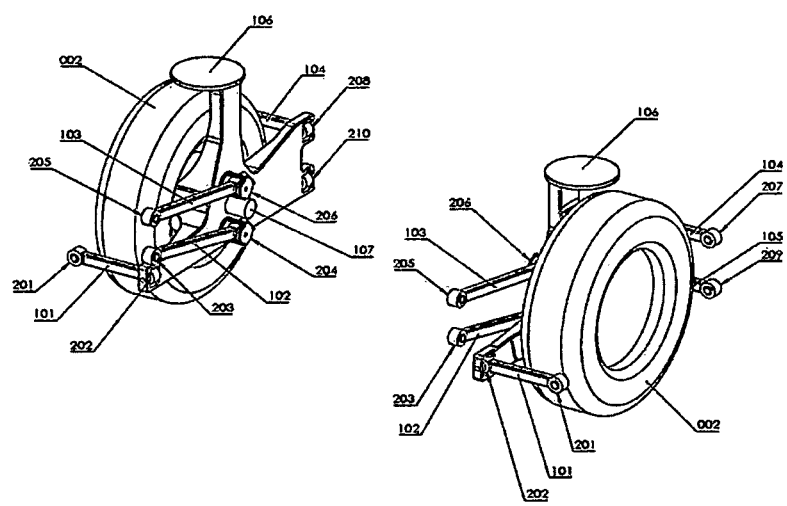
FIG. 2 an isometric view of the first embodiment without chassis.

Referring to FIGS. 1 to 4, the first embodiment of the prevent invention comprises chassis 100, first kinematic links 101, second kinematic link 102, third kinematic links 103, fourth kinematic link 104, fifth kinematic 105, knuckle assembly 106, first ball joint 201, second ball joint 202, third ball joint 203, fourth ball joint 204, fifth ball joint 205, sixth ball joint 206, seventh ball joint 207, eighth ball joint 208, ninth ball joint 209, and tenth ball joint 210.

Figure 3:
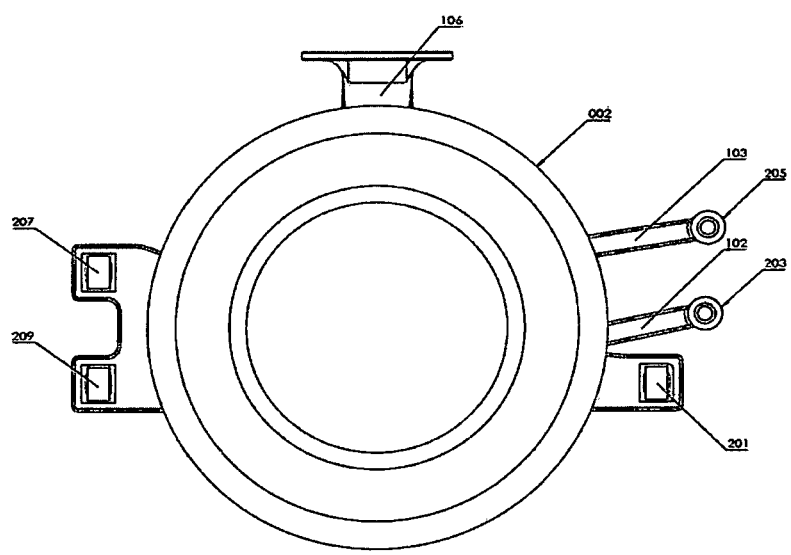
FIG. 3 a side view of the first embodiment.
Figure 4:
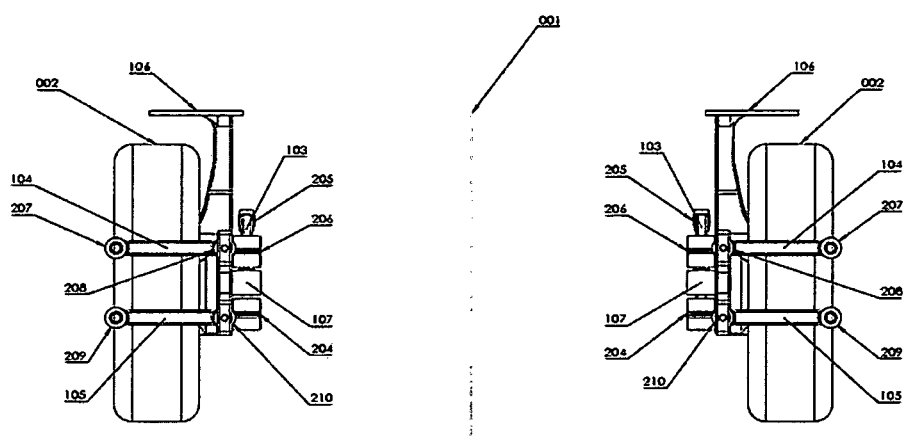
FIG. 4 a rear view of the first embodiment.
Figure 5:
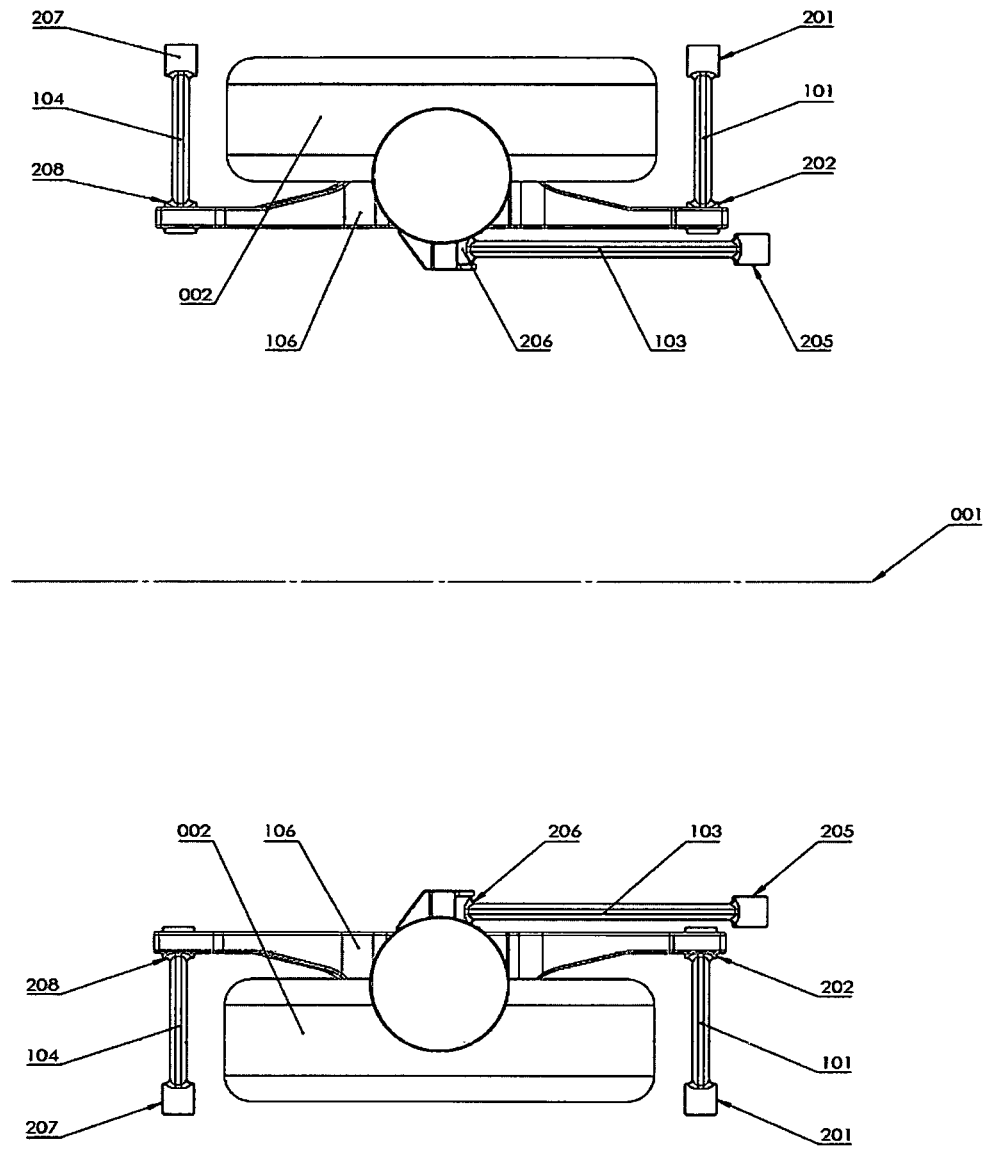
FIG. 5 is a top view of the first embodiment.
Figure 6:
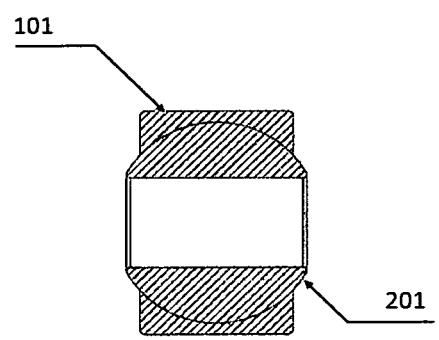
FIG. 6 is a section view of the bail joint of the first embodiment.

In order to improve clarity and to avoid confusion in the description, only one side of the suspension parts are mentioned hereinafter. Rear axle is defined at the rotating axis of the rear wheel 002. Referring to FIGS. 3 and 4, vehicle center line 001 denotes the center plane of the vehicle.

A knuckle assembly 106 is placed inward of the rear wheel 002, with the rear wheel 002 rotatably connected to the knuckle assembly 106. A first kinematic link 101 is placed transversely forward of the rear wheel 002 and connects to the chassis via a first ball joint 201 and connects to the knuckle assembly 106 via a second ball joint 202. A second kinematic link 102 is placed longitudinally inward of the knuckle assembly 106 and connects to the knuckle assembly 106 via a fourth ball joint 204 and connects to the chassis via a third ball joint 203. A third kinematic link 103 is placed longitudinally above the second kinematic link 102 and inward of the knuckle assembly 106, which the third kinematic link 103 connects to the knuckle assembly 106 via a sixth ball joint 206 and connects to the chassis via a fifth ball joint 205. A fifth kinematic link 105 is placed transversely rearward of the rear wheel 002 and connects to the chassis via a ninth ball joint 209 and connects to the knuckle assembly 106 via a tenth ball joint 210. A fourth kinematic link 104 is placed transversely above the fifth kinematic link 105 and rearward of the rear wheel 002 and connects to the chassis via a seventh ball joint 207 and connects to the knuckle assembly 106 via an eighth ball joint 208. An electric machine 107 is place inside of the knuckle assembly 106 to provide traction force to the rear wheel 002.

It is mentioned that the first ball joint 201, the second ball joint 202, the third ball joint 203, the fourth ball joint 204, the fifth ball joint 205, and the sixth ball joint 206 are placed forward of the axis of the rear wheel 002, and the seventh ball joint 207, the eighth ball joint 208, the ninth ball joint 209 and the tenth ball joint 210 are placed rearward of the axis of the rear wheel 002. The third ball joint 203 is placed forward of the fourth ball joint 204, and the fifth ball joint 205 is placed forward of the sixth ball joint 206. The first ball joint 201 is placed outward of the second ball joint 202, the seventh ball joint 207 is placed outward of the eighth ball joint 208, and the ninth ball joint 209 is placed outward of the tenth ball joint 210. The fifth ball joint 205 is placed above the third ball joint 203, the sixth ball joint 206 is placed above the fourth ball joint 204, the seventh ball joint 207 is placed above the ninth ball joint 209, and the eighth ball joint 208 is placed above the tenth ball joint 210.

It is common in the industry that the ball joint can be replaced with rubber bushing.

In some applications, the seventh ball joint 207 and the eighth ball joint 208 can be instead placed forward of the rear wheel 002. This modification changes neither the function nor the characteristics of the abovementioned embodiment.

What is claimed is:

1. An independent rear suspension system comprising:
a chassis structure, a first kinematic link, a second kinematic link, a third kinematic link, a fourth kinematic link, a fifth kinematic link, a knuckle assembly, a first ball joint, a second ball joint, a third ball joint, a fourth ball joint, a fifth ball joint, a sixth ball joint, a seventh ball joint, an eighth ball joint, a ninth ball joint, a tenth ball joint, and a rear wheel, wherein the first ball joint is attached to the chassis structure, the first kinematic link is attached to the first ball joint, the second ball joint is attached to the first kinematic link, the second ball joint is attached to the knuckle assembly, the knuckle assembly is attached to fourth ball joint, the fourth ball joint is attached to the second kinematic link, the second kinematic link is attached to the third ball joint, the third ball joint is attached to the chassis structure, the fifth ball joint is attached to the chassis structure, the fifth ball joint is attached to the third kinematic link, the third kinematic link is attached to the sixth ball joint, the sixth ball joint is attached to the knuckle assembly, the eighth ball joint is attached to the knuckle assembly, the eighth ball joint is attached to the fourth kinematic link, the seventh ball joint is attached to the fourth kinematic link, the seventh ball joint is attached to the chassis structure, the ninth ball joint is attached to the chassis structure, the ninth ball joint is attached to the fifth kinematic link, the fifth kinematic link is attached to the tenth ball joint, and the tenth ball joint is attached to the knuckle assembly;

wherein the first ball joint, second ball joint, third ball joint, fourth ball joint, fifth ball joint, and sixth ball joint are placed forward of the rear wheel axis; wherein the seventh ball joint, eighth ball joint, ninth ball joint and tenth ball joint are placed behind the rear wheel axis; wherein the third ball joint is placed forward of the fourth ball joint and the fifth ball joint is placed forward of the sixth ball joint; wherein the first ball joint is placed outward of the second ball joint, the seventh ball joint is placed outward of the eighth ball joint, and the ninth ball joint is placed outward of the tenth ball joint; wherein the fifth ball joint is placed above the third ball joint, the sixth ball joint is placed above the fourth ball joint, the seventh ball joint are placed above the ninth ball joint, and the eighth ball joint is placed above the tenth ball joint.

2. The independent rear suspension system of claim 1, wherein at least one of said first to said tenth ball joints is replaced by a rubber bushing.

3. The independent rear suspension system of claim 1, wherein an electric machine is attached to the knuckle assembly.

* * * * *